Feb. 6, 1962 J. W. ALLEN 3,020,059
LIFT CONVEYOR
Filed April 14, 1960 2 Sheets-Sheet 1
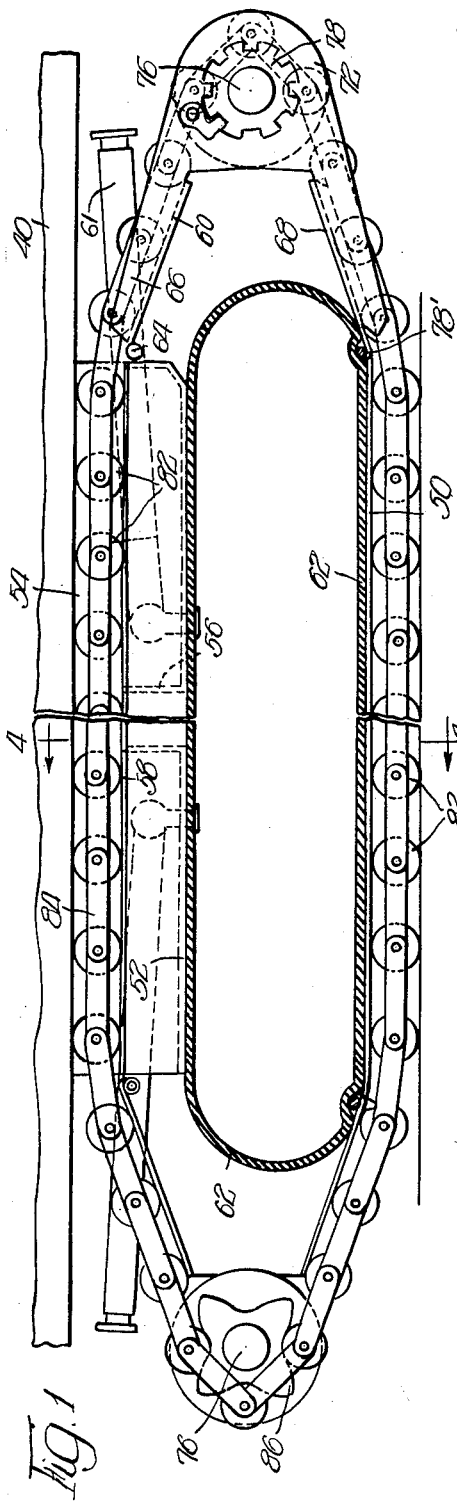
INVENTOR.
John W. Allen,
BY Sabin C. Bronson.
Atty.

Feb. 6, 1962 J. W. ALLEN 3,020,059
LIFT CONVEYOR
Filed April 14, 1960 2 Sheets-Sheet 2
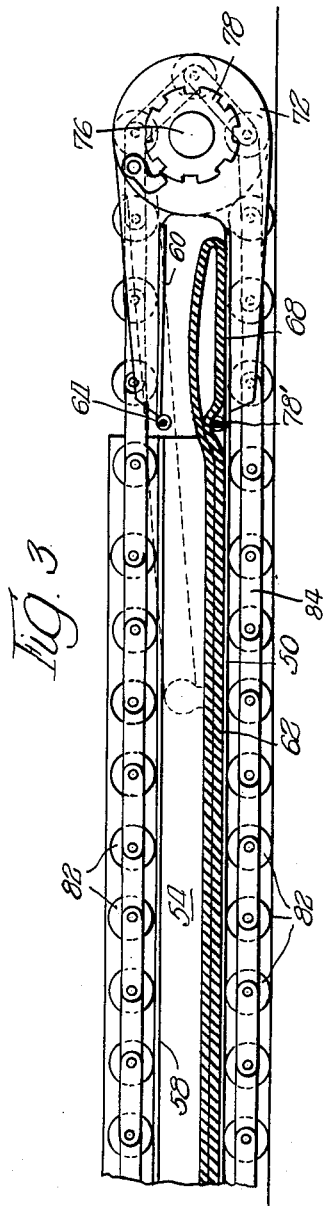
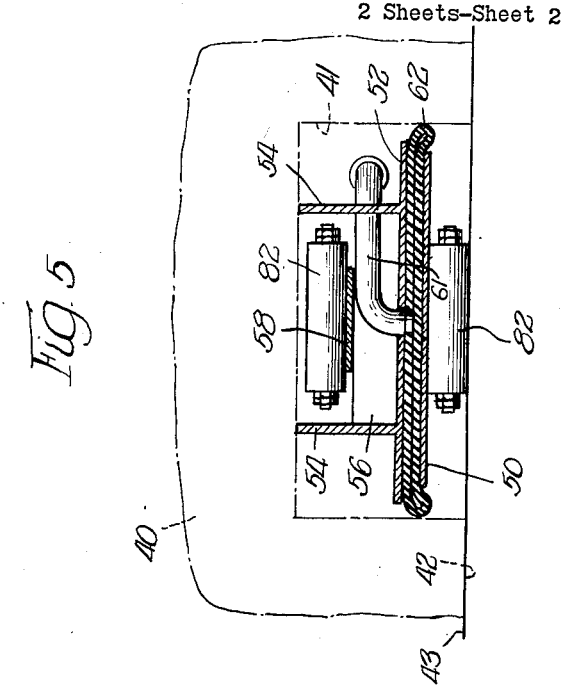
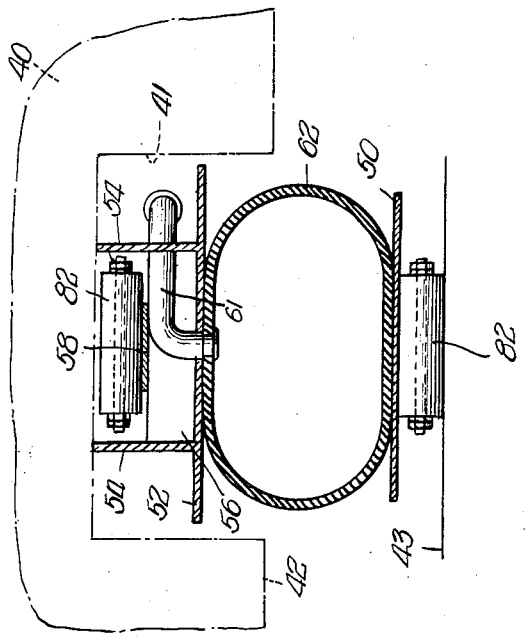
INVENTOR.
John W. Allen,
BY Sabin C. Bronson.
Atty.

United States Patent Office 3,020,059
Patented Feb. 6, 1962

3,020,059
LIFT CONVEYOR
John W. Allen, La Grange, Ill., assignor to Stanray Corporation, Chicago, Ill., a corporation of Delaware
Filed Apr. 14, 1960, Ser. No. 22,149
6 Claims. (Cl. 280—43.23)

The present invention relates to lift conveyor and particularly to pneumatic lift conveyors adapted for lifting and moving heavy objects.

In railroad freight service there is being offered compartmentalized shipping facilities adapted to handle shipments corresponding to a fractional part of a railroad boxcar load. In one form of compartmentalized shipping, the facility is a shipping container which is carried locked in place on a railroad flatcar. The shipping container may be of any convenient size, and, in one example, may have a cubic capacity corresponding to one-half that of a railroad boxcar. According to best and most efficient usage, these containers are transferred from the flatcar in a railroad freight yard onto a truck bed and hauled to the warehouse or plant where the container can be directly loaded or unloaded, as the case may be, or transferred from the truck bed to the shipping dock to await the convenience of the shipper.

Some of the efficiency and the attendant economic savings to be derived from this type of shipping operation are lost when it is necessary to employ cranes or other special heavy equipment for effecting transfer of the containers between the flatcar, the truck bed and the shipping dock. Nor is this loss of efficiency to be avoided by providing each container with motive means because such means are generally expensive and complicated, subject to damage because of the severe handling to which these units are subjected, and are utilized only infrequently during the transport life of the unit. Accordingly, to complement the efficiency of this type of shipping operation there is need for a simple and rugged device for easily and conveniently effecting transfers of such shipping containers.

It is a general object of the present invention to provide a lift conveyor of a simple and rugged construction which can be easily utilized for lifting and effecting the transfer of heavy objects.

An additional object of the invention is to provide an improved mobile conveyor of a simple and rugged construction having a low silhouette adapted to fit between stacking blocks or supporting stubs and capable of lifting heavy objects supported thereby.

A more specific object of the invention is to provide an improved mobile pneumatic lift conveyor extendable in a vertical direction and supported on a plurality of rollers distributed over a large area by means of which heavy objects can be lifted and easily moved over discontinuous surfaces.

It is a further object of the invention to provide an improved mobile lift conveyor supported on a plurality of rollers extending between a pair of endless link chains surrounding the lift mechanism and extendable in a vertical direction therewith.

More specifically it is an object of the invention to provide means whereby positive braking or motivation of the unit is possible by the application thereto of a pawl and a ratchet arrangement, a motorized flexible shaft, fluid cylinder, or other power means to rotate the endless roller chain.

Additional objects and features of the invention pertain to the particular structure and arrangements thereof whereby the above identified objects are achieved. The invention, both as to its structure and method of operation, will be better understood by reference to the following specification and drawings, forming a part thereof, wherein:

FIGURE 1 is a broken cross sectional view of a mobile pneumatic lift conveyor in accordance with the invention;
FIGURE 2 is a partial top plan of FIGURE 1;
FIGURE 3 is a partial side elevation of FIGURE 2 showing the inflatable bag in longitudinal cross section and in deflated condition;
FIGURE 4 is a transverse cross-sectional view taken on the line 4—4 of FIGURE 1; and
FIGURE 5 is a view similar to FIGURE 4, but showing the inflatable bag in deflated condition.

Considering now the structure of the mobile pneumatic lift conveyor in accordance with the invention and referring generally to the drawings, there is shown a lift mechanism comprising essentially a bottom member 50, which is a flat flexible metallic plate, and an upper housing consisting of a flat metallic plate 52, to which are welded upright longitudinally disposed walls or stiffeners 54, between the approximate lower half of which are fixed spaced transverse spacer plates 56 for supporting thereupon the longitudinally disposed support plate 58 for the roller chain. Between the plate 52 of the upper housing and the lower housing plate 50 is disposed the inflatable bag 62, which is elongated and of substantially the length of the housings. The bag 62 is glued or otherwise fixed along its upper longitudinal central portion to the longitudinal central portion of the under surface of the plate 52, and similarly secured along its under longitudinal central portion to the longitudinal central portion of the upper surface of the plate 50. The bag is thus retained in position between the upper and lower housings during inflation or deflation of the bag. To facilitate inflation and deflation of the bag 62, a conduit 61 is provided which extends through the plate 52 of the cover channel and the wall of the bag. Conduit 61 is provided with a selectively operative valve of any suitable type to which may be connected an air hose for inflating the bag when desired. In use it is intended that two of these devices be used, each installed within a slot 41 of the bottom of a container 40 so that upon inflation of the bags the container is raised clear of the floor, as indicated in FIG. 4, and can be moved about on the roller chain. The bag transfers this lifting load to the lower flexible housing in a uniform and flexible manner so that each roller under the housing receives its proper share of the load and prevents high load concentrations. This type of support allows the flexible plate to bend so the rollers can accommodate themselves to irregularities in the floor such as humps or dips.

To provide stability to the pneumatic lift conveyor according to the invention, there is provided at each end hinged guides as shown most clearly in FIG. 1. The upper guide comprises a rectangular plate 60 which is hinged as at 64 to the end of plate 58. To the upper surface of plate 60 at the side edges thereof, a pair of spaced narrow plates 66—66 are welded along an edge thereof so as to be vertically disposed, thus forming, with the plate 60, a channel. Plates 66—66 extend beyond the plate 60 and have integrally formed therewith alined circular enlargements 74—74, each having an axial hole therethrough. Plates 66—66 are in longitudinal alinement with the walls or stiffeners 54—54. The bottom guide also comprises a flat plate 68, which is hinged as at 78' to the bottom plate 50 and to the under side of which plates 68 are secured, along one edge of each, a pair of spaced narrow plates 70—70. Plates 70—70 extend beyond the bottom plate 68 and have integrally formed therewith circular enlargements 72—72, each having an axial hole therethrough. The plates 70—70 are spaced apart slightly more than the plates 66—66 so that the enlargements 72—72 overlap the enlargements 74—74, with the holes therethrough in registry. An axle 76 extends through the registering openings in the enlargements 72—72 and 74—74 and thus hingedly connect the end guides. Just outside the enlargement 72, on the axle 76 is a pawl and a ratchet arrangement 78 to which a wrench or other power means may be applied to cause rotation of the axle 76. As previously stated, it is intended that two of these lifts be used under each container and therefore there is provided a torsion pipe 80 which extends between and connects two axles 76 of companion lifts under a container so that both roller chains would be moved upon rotation of axle 76 to insure straight line motion and prevent skewing of the load.

The roller chain itself comprises a plurality of rollers 82 connected at their ends by links 84 to provide a sort of treadmill type conveyor for the lift conveyor. Between the enlargements 74—74 on axles 76 are sprocket pinions 86 over which the roller chains are mounted and moved along by rotation of one of the pinions 86 by rotating axle 76 by means of the pawl and ratchet arrangement 78.

Thus there is provided power motivation for the roller chain. The roller chain operates between the members 54—54 and 66—66 and over the pinions 86 to insure the proper positioning of the chain on the lift at all times.

Considering now the manner in which the mobile pneumatic lift conveyors in accordance with the invention are employed, and referring specifically to FIGURES 1, 4 and 5, there is shown therein a body 40, representative of a shipping container, provided with a detent 41 in the lower surface thereof of a height sufficient to receive the retracted conveyors. As the conveyors are inflated in a manner as described, the cover arms or walls 54 contact the bottom wall 42 of the container and lifts the container from contact with the surface 43. Assuming that the surface 43 is representative of a truck bed of a motor transport and that the shipping container 40 is to be moved, a ratchet wrench is used to rotate the ratchet 78 which in turn rotates the associated pinion 86 which moves the endless roller chain, and the container 40, riding on the rollers 82 of the lifts, rolls across the surface 43 to any position desired. Accordingly, the shipping container 40 may be conveniently positioned on the surface 43 and thereafter the lifts deflated to support the shipping container directly on the surface 43. The lifts are then removed from under the shipping container and made available for other uses.

While the invention has been described in terms of a lift conveyor adaptable for lifting and moving shipping containers, it is appreciated that such lifts can enjoy general utility in any heavy lifting operation.

It may be desirable to glue the bag 62 to the cover plate member 52, and to the base member 50 along the opposite longitudinal center lines of said members, so as to position the bag correctly relative thereto. If the members are correctly positioned relative to each other, the air pressure can only cause relative vertical movement of said members.

While the embodiments described herein are at present considered to be preferred, it is appreciated that variations and modifications may be made therein. Accordingly, it is intended to cover in the appended claims all such modifications and variations as fall within the true spirit and scope of the invention.

I claim:
1. A lift conveyor for lifting and moving heavy objects, comprising an elongated bottom plate member, an elongated cover channel plate member with its open face upward, means uniting the ends of said members on a transverse axis for permitting vertical movement therebetween, endless roller link chains longitudinally surrounding said members and means, and an inflatable container carried between said members, whereby responsive to the inflation of the container expanding forces are exerted between said members for causing extending movement therebetween.

2. The structure of claim 1, said means comprising guides hingedly uniting the ends of said members.

3. The structure of claim 1, and sprocket pinions associated with said hinged means, for guiding said endless chains, and means for attaching power means for driving a sprocket pinion for rotating said endless chains.

4. An elongated narrow lift conveyor for lifting and moving heavy objects, comprising spaced members, means pivotally uniting the ends of said members on a transverse axis for permitting only perpendicular movements therebetween, an elongated narrow inflatable container carried between and interlying said members, said pivotal means carrying sprocket pinions, an endless roller link chain surrounding said members and operable on said pinions, whereby responsive to inflation of said bag forces are exterted between said members for extending said members perpendicularly and means for attaching power means for rotating a sprocket pinion to move said roller chain and thereby said lift conveyor.

5. A lift conveyor for lifting and moving heavy objects, comprising spaced members, means pivotally uniting said members for permitting only perpendicular movements therebetween, sprocket pinions associated with said pivotal means, an inflatable container interlying said spaced members, and spaced roller link chains surrounding said spaced members and sprocket pinions, whereby responsive to the inflation of said container expanding forces are exerted between said members for causing extending movement therebetween.

6. A lift conveyor for lifting and moving heavy objects, comprising spaced elongated perpendicular flexible members, means pivotally uniting the ends of said members on a transverse axis for permitting only perpendicular movements therebetween, sprocket pinions associated with said pivotal means, endless roller link chains surrounding said spaced members and sprocket pinions, an elongated inflatable container interlying said flexible members, and means for connecting means for inflating said container whereby responsive to the inflation of said container expanding forces are exerted between said members causing extending movement therebetween.

References Cited in the file of this patent

UNITED STATES PATENTS

| Re. 24,272 | Albee | Feb. 12, 1957 |
| 2,828,027 | Stevenson et al. | Mar. 25, 1958 |
| 2,877,981 | McMurry | Mar. 17, 1959 |
| 2,923,578 | Marsh | Feb. 2, 1960 |